(12) United States Patent
Lee et al.

(10) Patent No.: US 11,470,049 B2
(45) Date of Patent: Oct. 11, 2022

(54) METHOD OF PROVIDING COMMUNICATION CHANNEL FOR SECURE MANAGEMENT BETWEEN PHYSICALLY SEPARATED UNIWAY DATA TRANSMITTING DEVICE AND UNIWAY DATA RECEIVING DEVICE IN UNIWAY SECURITY GATEWAY SYSTEM, AND UNIWAY DATA TRANSCEIVING DEVICE FOR PROVIDING TWO UNIWAY COMMUNICATION CHANNELS THEREFOR (71) Applicant: SYSMATE Co., Ltd., Daejeon (KR)

(72) Inventors: Sangman Lee, Daejeon (KR); Shinil Moon, Daejeon (KR); Seungtae Paek, Seoul (KR)

(73) Assignee: SYSMATE Co., Ltd., Daejeon (KR)

( * ) Notice: Subject to any disclaimer, the term of this patent is extended or adjusted under 35 U.S.C. 154(b) by 378 days.

(21) Appl. No.: 16/851,346

(22) Filed: Apr. 17, 2020

(65) Prior Publication Data
US 2020/0336458 A1 Oct. 22, 2020

(30) Foreign Application Priority Data
Apr. 18, 2019 (KR) .......................... 10-2019-0045363

(51) Int. Cl.
*H04L 9/40* (2022.01)
*H04L 12/66* (2006.01)
(Continued)

(52) U.S. Cl.
CPC ............ *H04L 63/029* (2013.01); *G06F 21/64* (2013.01); *H04B 1/02* (2013.01); *H04B 1/06* (2013.01);
(Continued)

(58) Field of Classification Search
CPC ... H04L 63/029; H04L 9/0643; H04L 9/0863; H04L 9/3228; H04L 9/3242; H04L 12/66;
(Continued)

(56) References Cited

U.S. PATENT DOCUMENTS 7,412,053 B1 * 8/2008 Lyle ...................... H04L 9/0844
714/724
7,797,536 B1 * 9/2010 Lyle ...................... H04L 9/0844
713/168
(Continued)

FOREIGN PATENT DOCUMENTS

| KR | 10-2014-0075938 A | 6/2014 |
| KR | 10-1558491 B1 | 10/2015 |
| KR | 10-2018-0028648 A | 3/2018 |

OTHER PUBLICATIONS

Korean Office Action dated Oct. 29, 2020 in counterpart Korean Patent Application No. 10-2019-0045363 (8 pages in Korean).
(Continued)

*Primary Examiner* — Cheng-Feng Huang
(74) *Attorney, Agent, or Firm* — NSIP Law (57) ABSTRACT

Provided are a method of providing a communication channel for secure management between a uniway data transmitting device and a uniway data receiving device which are physically separated from each other in a uniway security gateway system, and a uniway data transceiving device for providing two uniway communication channels therefor. The uniway security gateway system includes a uniway data transmitting device located in a secure area and a uniway data receiving device located in a control area, wherein the uniway data transmitting device and the uniway data receiving device provide a first communication channel for transmitting and receiving data in one direction from the secure area to the control area and a second communication channel
(Continued)

for transmitting and receiving management data in one direction from the control area to the secure area.

14 Claims, 5 Drawing Sheets

(51) Int. Cl.
| | | |
|---|---|---|
| *H04B 1/02* | (2006.01) | |
| *H04L 9/32* | (2006.01) | |
| *G06F 21/64* | (2013.01) | |
| *H04B 1/06* | (2006.01) | |
| *H04L 9/08* | (2006.01) | |
| *H04L 9/06* | (2006.01) | |
| *H04L 47/31* | (2022.01) | |

(52) U.S. Cl.
CPC .......... *H04L 9/0643* (2013.01); *H04L 9/0863* (2013.01); *H04L 9/3228* (2013.01); *H04L 9/3242* (2013.01); *H04L 12/66* (2013.01); *H04L 47/31* (2013.01); *H04L 63/18* (2013.01)

(58) Field of Classification Search
CPC ......... H04L 47/31; H04L 63/18; G06F 21/64; H04B 1/02; H04B 1/06
See application file for complete search history.

(56) References Cited

U.S. PATENT DOCUMENTS

| | | | | |
|---|---|---|---|---|
| 2008/0008207 | A1* | 1/2008 | Kellum | ................ H04L 63/162 |
| | | | | 370/433 |
| 2009/0067421 | A1* | 3/2009 | Linden | .................... H04L 63/18 |
| | | | | 370/389 |
| 2010/0275031 | A1* | 10/2010 | Ferry | .................... H04L 63/029 |
| | | | | 713/168 |
| 2013/0117556 | A1* | 5/2013 | Coleman | ............. H04L 63/0492 |
| | | | | 713/153 |
| 2016/0261634 | A1* | 9/2016 | Harrison | ................. H04L 63/18 |
| 2017/0339191 | A1* | 11/2017 | Kim | ....................... H04L 9/3236 |
| 2018/0139190 | A1* | 5/2018 | Chaum | ................. G06F 21/602 |
| 2019/0162843 | A1* | 5/2019 | Jiang | ..................... H04L 9/3242 |
| 2020/0336808 | A1* | 10/2020 | Menoher | ................. H04L 63/10 |
| 2020/0389469 | A1* | 12/2020 | Litichever | ............. H04L 63/029 |
| 2021/0176223 | A1* | 6/2021 | Falk | ..................... H04L 63/0281 |
| 2021/0288978 | A1* | 9/2021 | Harrison | ............. H04L 63/1416 |
| 2021/0377728 | A1* | 12/2021 | Min | ..................... H04L 9/0643 |

OTHER PUBLICATIONS

Korean Office Action dated Apr. 7, 2020 in the corresponding Korean Patent Application No. 10-2019-0045363 (6 pages in Korean).

* cited by examiner

METHOD OF PROVIDING COMMUNICATION CHANNEL FOR SECURE MANAGEMENT BETWEEN PHYSICALLY SEPARATED UNIWAY DATA TRANSMITTING DEVICE AND UNIWAY DATA RECEIVING DEVICE IN UNIWAY SECURITY GATEWAY SYSTEM, AND UNIWAY DATA TRANSCEIVING DEVICE FOR PROVIDING TWO UNIWAY COMMUNICATION CHANNELS THEREFOR

CROSS-REFERENCE TO RELATED APPLICATION(S)

This application claims priority from Korean Patent Application No. 10-2019-0045363, filed on Apr. 18, 2019, in the Korean Intellectual Property Office, the disclosure of which is incorporated herein by reference in its entirety.

BACKGROUND

1. Field

The following description relates to communication technology, and more specifically, to a data transmitting device for transmitting data to a data receiving device in one direction and a data receiving device for receiving data from the data transmitting device in one direction, and a method of transmitting data in one direction using the same.

2. Description of Related Art

A uniway security gateway system refers to a security platform system capable of transmitting data only in one direction. General network communication is vulnerable to data leakage because data can be transmitted and received therethrough. However, there is no reception data for data transmission when the uniway security gateway system is used and thus it is possible to construct a security system whereby no data leakage occurs. Data communication from transmission equipment to reception equipment can be established only in one direction and thus is increasing more and more in value as security becomes important.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

The following description suggests a method of providing a communication channel for secure management between a uniway data transmitting device and a uniway data receiving device, which are physically separated from each other, to securely transmit and receive management data in a uniway security gateway system, and a uniway data transceiving device for providing two uniway communication channels therefor.

In one general aspect, a uniway security gateway system includes a uniway data transmitting device located in a secure area and a uniway data receiving device located in a control area. The uniway data transmitting device and the uniway data receiving device provide a first communication channel for transmitting and receiving data in one direction from the secure area to the control area and a second communication channel for transmitting and receiving management data in one direction from the control area to the secure area.

The uniway data transmitting device and the uniway data receiving device may additionally define a management data transmission datagram for transmission of the management data between the uniway data transmitting device and the uniway data receiving device to be differentiated from an application data transmission datagram for transmission of application data from the secure area to the control area, and may transmit and receive the management data transmission datagram in one direction.

The management data transmission datagram may include a header which includes a flag for identifying the management data transmission datagram and a transmission direction and a tag for integrity verification as to whether the management data transmission datagram is valid.

The tag for integrity verification of the management data transmission datagram may include a hash key {OTP} generated by inputting a one-time password (OTP), which is generated using an OTP synchronized between the uniway data transmitting device and the uniway data receiving device, into an encryption key derivation function, and a salt value used for the generation of the hash key {OTP}.

The uniway data transmitting device may include a first transmitter configured to transmit application data and the management data in one direction, a first receiver configured to receive the management data in one direction, a first device manager configured to generate the management data, and a first uniway communication data manager configured to manage transmitted and received data and verify integrity of the management data. The uniway data receiving device may include a second transmitter configured to transmit the management data in one direction to the secure area, a second receiver configured to receive the application data and the management data in one direction, a second device manager configured to generate the management data, and a second uniway communication data manager configured to manage transmitted and received data and verify integrity of the management data.

The first uniway communication data manager may verify only integrity of a management data transmission datagram generated by the uniway data receiving device and received through the first receiver and skip verification of integrity of a management data transmission datagram generated by the first device manager, and the second uniway communication data manager may verify only integrity of a management data transmission datagram generated by the uniway data transmitting device and received through the second receiver and skip verification of integrity of a management data transmission datagram generated by the second device manager, thereby minimizing a resource utilization rate.

The second receiver may receive a management data transmission datagram for transmission of the management data. The second uniway communication data manager may perform integrity verification on the received management data transmission datagram and transmit the management data transmission datagram to the second transmitter while transmitting the management data transmission datagram to the second device manager when the integrity verification succeeds. The second transmitter may transmit the management data transmission datagram to the first receiver of the uniway data transmitting device via a uniway data transmission channel. The first uniway communication data manager may confirm that the uniway data receiving device receives the management data normally by receiving the management data transmission datagram from the first receiver.

The second device manager may generate a management data transmission datagram for a response to the management data and transmit the management data transmission datagram to a second uniway communication data manager. The second uniway communication data manager may skip verification of integrity of the management data transmission datagram generated by the second device manager and transmit the management data transmission datagram to the second transmitter. The second transmitter may transmit the management data transmission datagram received from the second uniway communication data manager to the first receiver of the uniway data transmitting device via the uniway data transmission channel. The first uniway communication data manager may confirm the response to the management data from the uniway data receiving device by receiving the management data transmission datagram from the first receiver.

The first receiver may receive the management data transmission datagram from the uniway data receiving device and transmit the management data transmission datagram to the first uniway communication data manager to confirm that a response to the management data from the uniway data receiving device is transmitted to the uniway data transmitting device normally. The first uniway communication data manager may perform integrity verification on the management data transmission datagram received through the first receiver and transmit the management data transmission datagram to the first transmitter while transmitting the management data transmission datagram to the first device manager when the integrity verification succeeds. The first transmitter may transmit the management data transmission datagram received from the first uniway communication data manager to the second receiver of the uniway data receiving device via the uniway data transmission channel. The second uniway communication data manager may confirm that the response to the management data from the uniway data receiving device is transmitted to the uniway data transmitting device normally by receiving the management data transmission datagram from the second receiver.

In another general aspect, a uniway data transmission method includes receiving, by a uniway data receiving device, a management data transmission datagram for transmission of management data through a second receiver; performing, by the uniway data receiving device, integrity verification on the management data transmission datagram received through a second uniway communication data manager and transmitting the verified management data transmission datagram to a second transmitter while transmitting the verified management data transmission datagram to a second device manager when the integrity verification succeeds; transmitting, by the uniway data receiving device, the management data transmission datagram to a first receiver of a uniway data transmitting device through a uniway data transmission channel; and confirming, by the uniway data transmitting device, that the uniway data receiving device receives the management data normally by receiving the management data transmission datagram from the first receiver through a first uniway communication data manager.

The uniway data transmission method may further include generating, by the uniway data receiving device, a management data transmission datagram for a response to the management data through a second device manager and transmitting the management data transmission datagram to the second uniway communication data manager; skipping, by the uniway data receiving device, integrity verification through the second uniway communication data manager and transmitting the management data transmission datagram to the second transmitter; transmitting, by the uniway data receiving device, the management data transmission datagram to a first receiver of the uniway data transmitting device through the uniway data transmission channel; and confirming, by the uniway data transmitting device, a response to a result of processing the management data from the uniway data receiving device by receiving the management data transmission datagram from the first receiver through a first uniway communication data manager.

The uniway data transmission method may further include performing, by the uniway data transmitting device, integrity verification by transmitting the management data transmission datagram received through the first receiver to a first uniway communication data manager to confirm that a response to the management data from the data receiving device is transmitted to the uniway data transmitting device normally; transmitting, by the uniway data transmitting device, the management data transmission datagram to a first transmitter through the first uniway communication data manager while transmitting the management data transmission datagram to a first device manager when the integrity verification succeeds; transmitting, by the uniway data transmitting device, the management data transmission datagram to a second receiver of the uniway data receiving device through the first transmitter via a uniway data transmission channel; and confirming, by the uniway data receiving device, that the response to the management data from the uniway data receiving device is transmitted to the uniway data transmitting device normally by receiving the management data transmission datagram from the second receiver through the second uniway communication data manager.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be clear to those of ordinary skill in the art. Also, descriptions of well-known functions and constructions may be omitted for increased clarity and conciseness.

Advantages and features of the present disclosure and methods of achieving them will be apparent from embodiments described below in detail in conjunction with the accompanying drawings. However, the present disclosure is not limited to the embodiments below and may be embodied in many different forms. Rather, these embodiments are provided so that this disclosure will be thorough and complete and will fully convey the concept of the invention to those of ordinary skill in the art. The present disclosure should be defined by the scope of the claims. The same reference numerals refer to the same components throughout the specification.

In describing embodiments of the present disclosure, well-known functions or constructions are not described in detail when it is determined that they would obscure the invention due to unnecessary detail. The terms described below are defined in consideration of functions of the embodiments of the present disclosure and may vary according to the intention of a user or operator, precedent, or the like. Therefore, the terms should be defined based on the whole context of the present disclosure.

Combinations of operations of blocks of each block diagram attached hereto and operations of each flowchart attached hereto may be performed by computer program instructions (execution engines). The computer program instructions may be stored in a processor of a general purpose computer, a special purpose computer, or other programmable data processing devices. Thus, a means to perform a function of each block of each block diagram or an operation of each flowchart is produced by the instructions executed by a processor of a computer or other programmable data processing devices.

The computer program instructions may be stored in a computer usable or readable memory oriented to a computer or other programmable data processing devices to implement functions in a particular way. Thus, an article of manufacture, including an instruction means for performing the function of each block of each block diagram or each operation in each flowchart, may be produced by the instructions stored in the computer usable or readable memory.

Because the computer program instructions may be stored in a computer or other programmable data processing devices, the functions of the blocks of each block diagram and the operations of each flowchart may be provided by these instructions performing a series of operations in the computer or the other programmable data processing devices to produce a process executable by a computer to operate the computer or the data processing device.

In addition, each block or each operation may represent a module, a segment, or part of code that includes one or more executable instructions for executing specified logical functions. In some alternative embodiments, functions referred to with respect to blocks or operations may be performed in an order different from that described herein. For example, two blocks or operations illustrated consecutively may be performed substantially simultaneously or in a reverse order of functions corresponding thereto when necessary.

Hereinafter, embodiments of the present disclosure will be described in detail with reference to the accompanying drawings. However, the embodiments of the present disclosure described below may be modified in various other forms and the scope of the present disclosure is not limited thereto. Embodiments of the present disclosure are provided to more fully describe the present disclosure to those of ordinary skill in the art.

Figure 1:
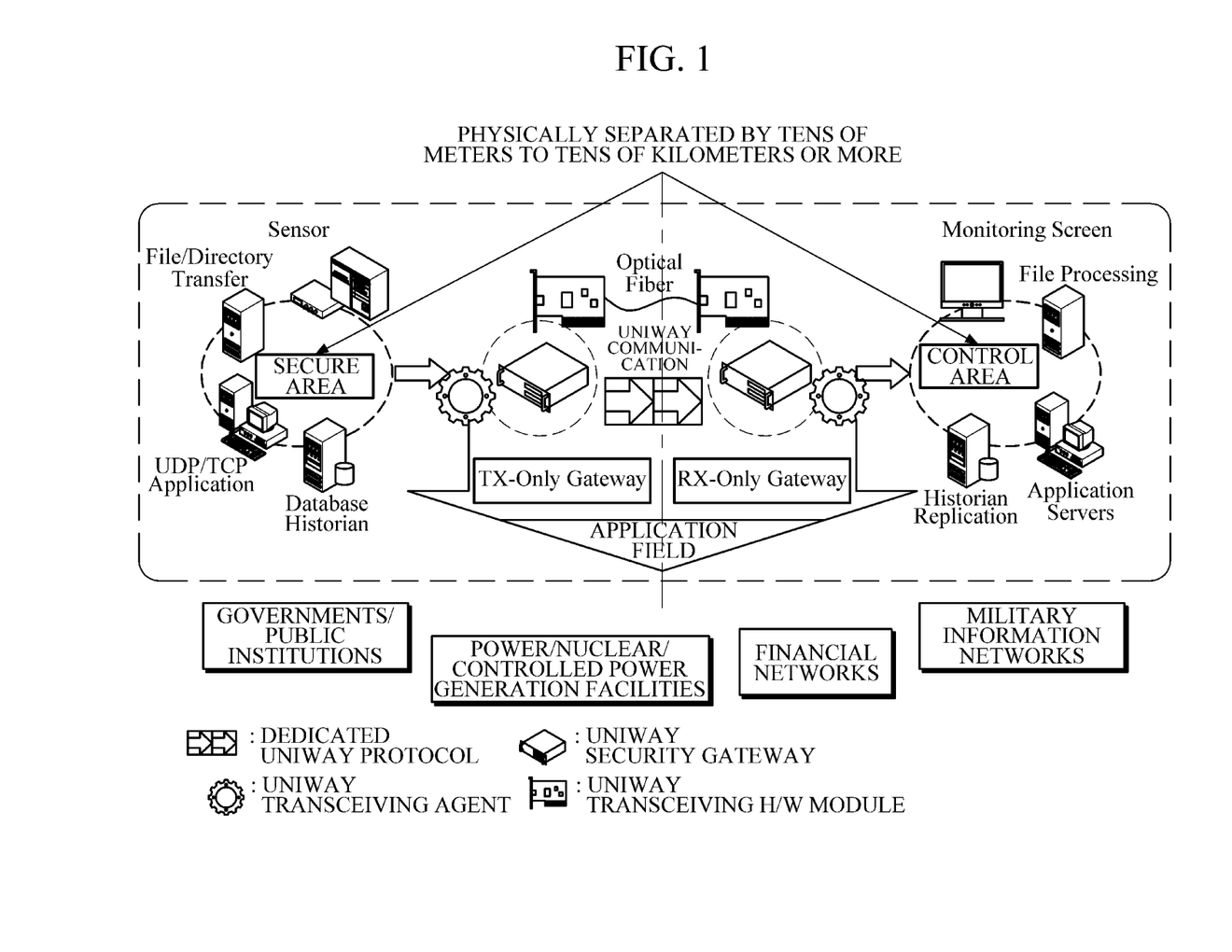
FIG. 1 is a diagram illustrating an overview of an operating environment of a uniway transceiving system according to an embodiment of the present disclosure.

FIG. 1 is a diagram illustrating an overview of an operating environment of a uniway transceiving system according to an embodiment of the present disclosure.

Referring to FIG. 1, a uniway secure gateway system according to an embodiment includes a uniway data transmitting device and a uniway data receiving device.

The uniway data transmitting device and the uniway data receiving device are devices that transmit and receive data in one direction, for example, network devices such as a uniway security gateway. FIG. 1 illustrates a uniway security gateway transmitting device (TX-only gateway) and a uniway security gateway receiving device (RX-only gateway). A uniway security gateway system is applicable to governments/public institutions, power/nuclear/controlled power generation facilities, financial networks, military information networks, and the like.

A general uniway secure gateway system is focused on securely transmitting a specific application program data packet in one direction. That is, the data transmitting device transmits application data in one direction to the data receiving device, and the data receiving device receives the application data in one direction from the data transmitting device. Such a uniway security gateway system has a structure which is accessible in a very strict and conservative manner with respect to two-way data communication for security reasons and thus is not generally permitted.

In a uniway security gateway system consisting of a pair of fairs that are operated while physically separated (e.g., tens of meters to tens of kilometers or more) from each other, data is transmitted from a highly secure area (hereinafter referred to as a 'secure area') to a low-security non-secure area (hereinafter referred to as a "control area"). As illustrated in FIG. 1, a secure area includes a sensor, a file/directory transfer device, a UDP/TCP application program, a database historian, and the like. The control area includes a monitoring screen, a file processing device, an application program server, historical replication, and the like.

In terms of operational and management efficiency, the demand for remote integrated management of a uniway security gateway system, e.g., updating policies and firmware, collecting logs, etc., is very high.

A uniway security gateway system according to an embodiment provides two uniway communication channels, including a communication channel for secure management between a uniway data transmitting device and a uniway data receiving device which are physically separated from each other, thereby enabling safe and efficient integrated management of the uniway data transmitting device and the uniway data receiving device which are operated as a pair of fairs.

Figure 2:
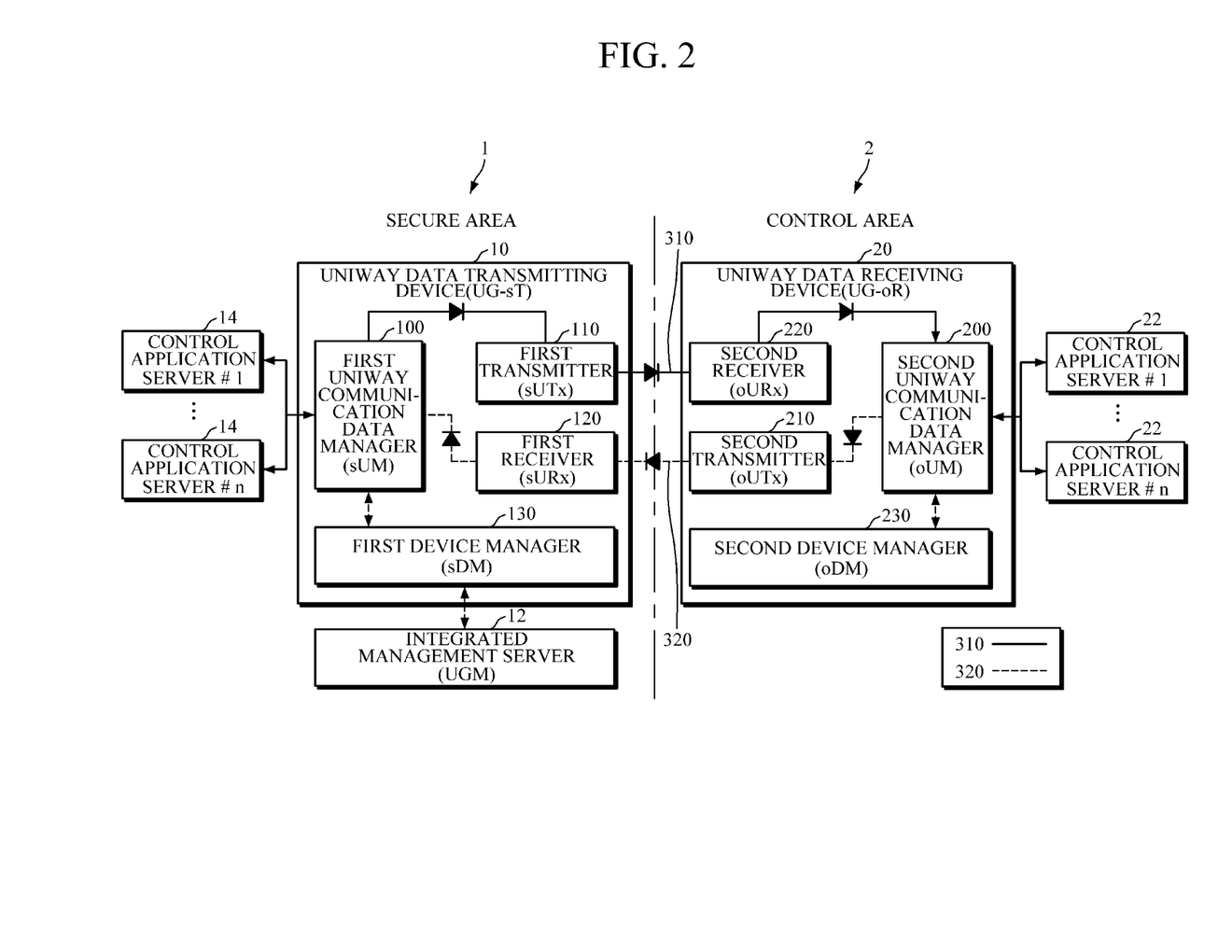
FIG. 2 is a diagram illustrating a configuration of a uniway secure gateway system according to an embodiment of the present disclosure.

FIG. 2 is a diagram illustrating a configuration of a uniway secure gateway system according to an embodiment of the present disclosure.

Referring to FIG. 2, the uniway security gateway system includes a uniway data transmitting device (hereinafter referred to as a 'transmitting device') (UG-sT) 10 and a uniway data receiving device (hereinafter referred to as a 'receiving device') (UG-oR) 20. The transmitting device (UG-sT) 10 is located in a secure area 1, and the receiving device (UG-oR) 20 is located in a control area 2. At least one control application server 14 is located in the secure area 1, and at least one control application server 22 is located in the control area 2. The control area 2 is a non-secure area compared to the secure area 1.

The transmitting device (UG-sT) 10 according to an embodiment includes a first uniway communication data manager (sUM) 100, a first transmitter (sUTx) 110, a first receiver (sURx) 120, and a first device manager (sDM) (130).

The first transmitter (sUTx) 110 transmits application data and management data in one direction to a receiving device (UG-oR) 20 in the control area 2 via a first communication channel 310. The first receiver (sURx) 120 receives the management data in one direction from the receiving device (UG-oR) 20 in the control area 2 via a second communication channel 320. In this case, the first device manager (sDM) 130 generates the management data, and the first uniway communication data manager (sUM) 100 manages transmitted and received data and verifies the integrity of the management data.

The receiving device (UG-oR) 20 according to an embodiment includes a second uniway communication data manager (oUM) 200, a second transmitter (oUTx) 210, a second receiver (oURx) 220, and a second device manager (oDM) 230.

The second transmitter (oUTx) 210 transmits management data in one direction to the transmitting device (UG-sT) 10 in the secure area 1 via the second communication channel 320. The second receiver (oURx) 220 receives application data and management data in one direction from the transmitting device (UG-sT) 10 via the second communication channel 320. In this case, the second device manager (oDM) 230 generates the management data, and the second uniway communication data manager (oUM) 200 manages transmitted and received data and verifies the integrity of the management data.

The transmitting device (UG-sT) 10 and the receiving device (UG-oR) 20 according to an embodiment provide the two uniway communication channels 310 and 320. The first communication channel 310 is a channel for transmitting application data or management data from the secure area 1 to the control area 2. The second communication channel 320 is a channel provided separately from the first communication channel 310 to transmit management data from the control area 2 to the secure area 1. When the transmitting device (UG-sT) 10 and the receiving device (UG-oR) 20 according to an embodiment are configured as a pair of fairs, not only the first communication channel 310 for transmission of data from the secure area 1 to the control area 2 in one direction but also the second communication channel 320 for transmission of data from the control area 2 to the secure area 1 is provided.

Figure 3:
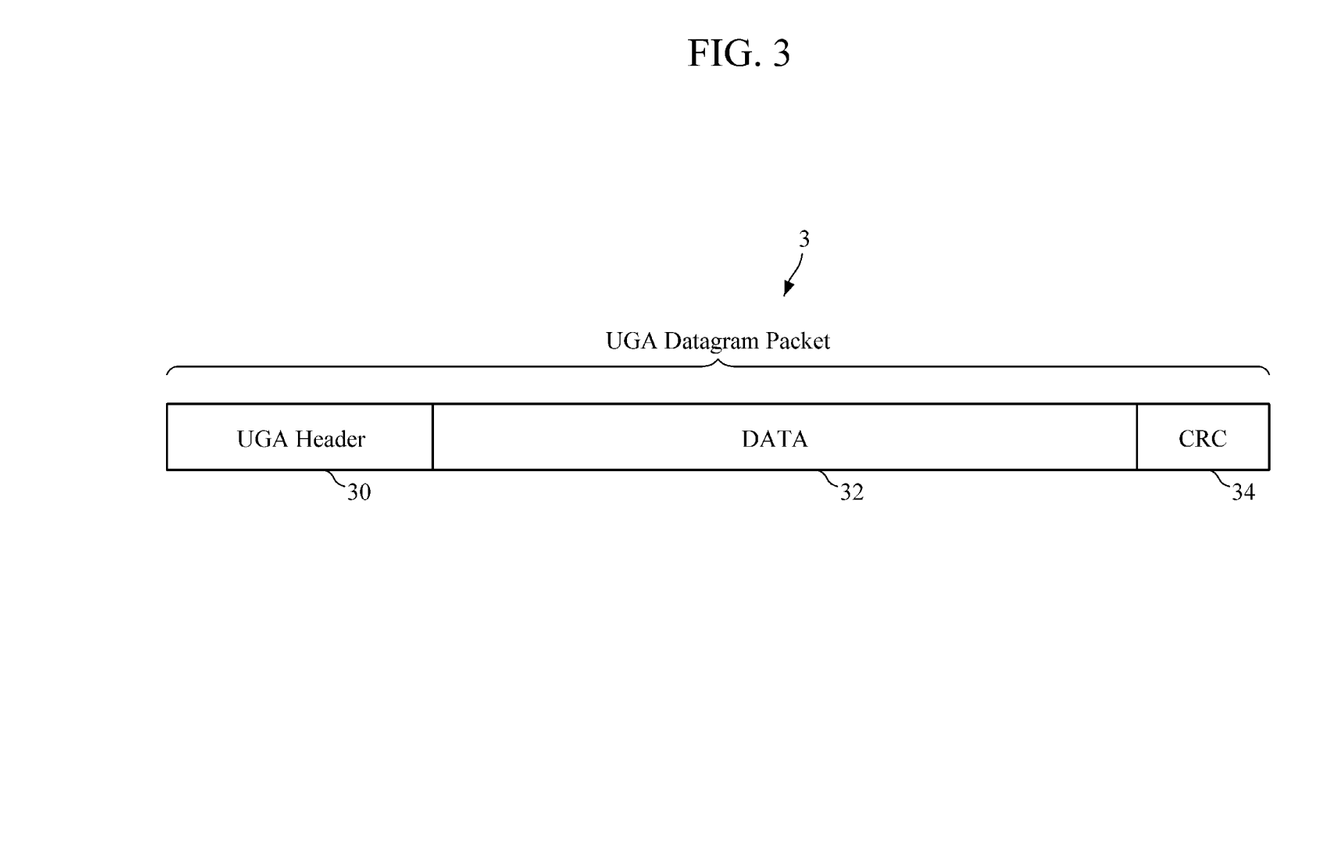
FIG. 3 is a diagram illustrating a configuration of an application data transmission datagram according to an embodiment of the present disclosure.
Figure 4:
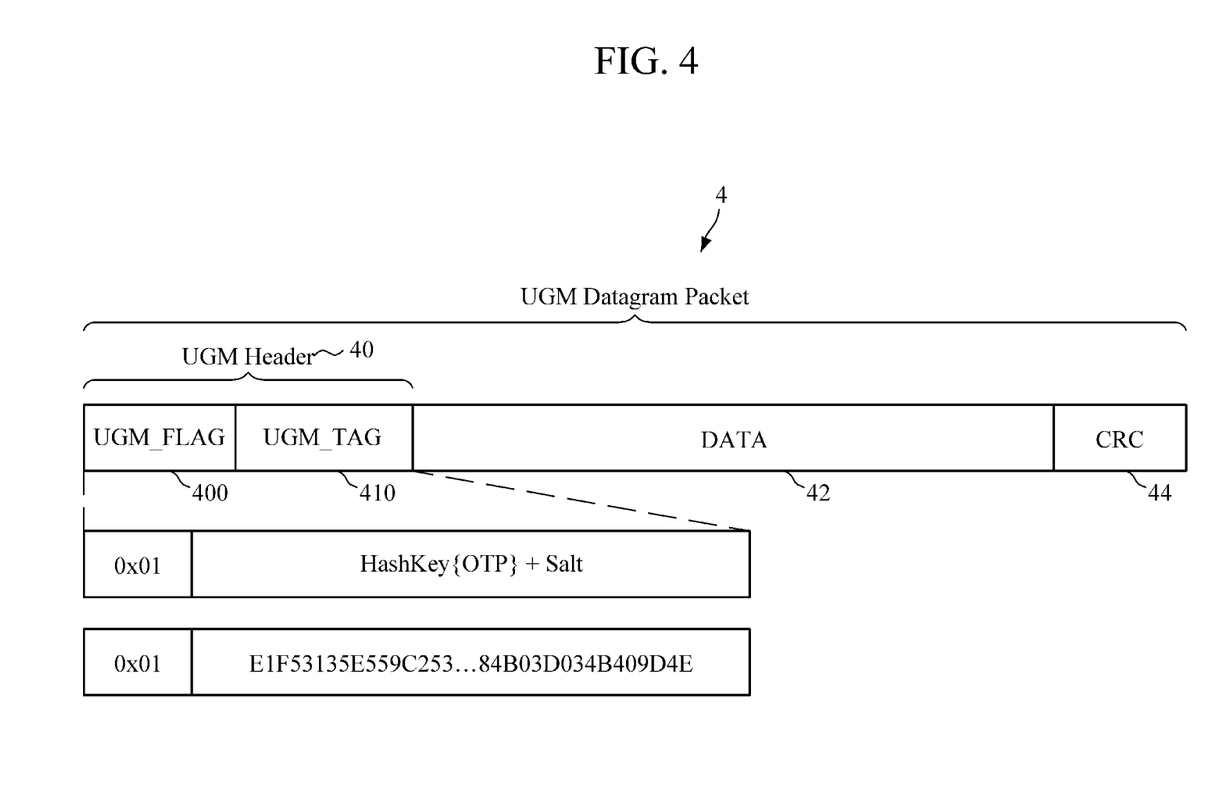
FIG. 4 is a diagram illustrating a configuration of a management data transmission datagram according to an embodiment of the present disclosure.

FIG. 3 is a diagram illustrating a configuration of an application data transmission datagram according to an embodiment of the present disclosure. FIG. 4 is a diagram illustrating a configuration of a management data transmission datagram according to an embodiment of the present disclosure.

Referring to FIGS. 2, 3, and 4, in a uniway security gateway system according to an embodiment, a datagram (a uniway gateway management (UGM) datagram) for transmission of management data between the transmitting device 10 and the receiving device 20 is additionally defined and used to be differentiated from a basic datagram (a uniway gateway application (UGA) datagram) for transmission of application data in one direction from the secure area 1 to the control area 2. The application data includes a control server program and the like. A UGA is a datagram identifier for transmission of application program data of a uniway security gateway in one direction. A UGM is a datagram identifier for transmission of management data of the uniway security gateway system in one direction.

Referring to FIG. 3, a UGA datagram packet 3 includes a UGA header 30, data 32, and cyclical redundancy check (CRC) bits 34. Transmission of the UGA datagram packet 3 from a secure area to the control area in one direction is not related to the scope of the present disclosure and thus a detailed description thereof is omitted here.

Referring to FIG. 4, a datagram (management data transmission datagram) (hereinafter referred to as 'UGM datagram') packet 4 for transmission of management data between a transmitting device and a receiving device includes a UGM header 40, data DATA 42, and CRC bits 44. In one embodiment, the UGM header 40 includes a UGM flag (UGM_FLAG) 400 and a UGM tag (UGM_TAG) 410. The UGM flag (UGM_FLAG) 400 identifies a UGM datagram and a transmission direction. The UGM tag (UGM_TAG) 410 is for verifying the integrity of a UGM datagram to determine whether the UGM datagram is valid. The UGM datagram is generated by device managers of each of a transmitting device and a receiving device.

Referring to FIGS. 2 and 4, the UGM flag (UGM_FLAG) 400 is "0x01" when the UGM datagram is transmitted from the secure area 1 to the control area 2, and refers to a UGM datagram generated by a first device manager (sDM) 130 of the transmitting device (UG-sT) 10 in the secure area 1. Similarly, when the UGM flag (UGM_FLAG) 400 is "0x02," the UGM flag (UGM_FLAG) 400 refers to a UGM datagram generated by a second device manager (oDM) 230 of the receiving device (UG-oR) 20 in the control area 2 and transmitted to the secure area 1.

The UGM tag (UGM_TAG) 410 includes a data value for integrity verification as to whether a UGM datagram packet is generated normally by the device managers 130 and 230 of the transmitting device 10 and the receiving device 20 configured as a pair. The data value for integrity verification may include a HashKey {OTP} generated using an encryption key derivation function PBKDF2 that conforms to the pkcs #5 standard using a one-time password (OTP) generated using an OTP synchronized between the transmitting device 10 and the receiving device 20, and an m-byte salt value used in this case.

A method of generating the HashKey {OTP} has the following features.

1) PBKDF2 (Password-Based Key Derivation Function 2)

PBKDF2 is an encryption key derivation function that conforms to PKCS #5 (a password-based encryption key derivation standard: RFC2898) of the public-key cryptography standard (PKCS) series developed by the RSA Lab, and is a public library (an open source). PBKDF2 was developed to protect against password brute force attacks.

A derived key DK corresponding to a key derived by putting a password into the encryption key derivation function PBKDF2 is a formula DK=PBKDF2 (PRF, Password, Salt, c, dkLen). In this case, the PRF is a pseudorandom function using two parameters having an output length: hLen (e.g., a keyed HMAC). The password is a master key, and the derived key DK is generated from the master key. Salt is an encrypted value with a series of bits. c is a desired number of iterations (=an iteration count). dkLen is a desired bit length of the derived key DK. DK is the generated derived key.

2) Generation of HashKey {OTP}

HashKey {OTP}=PBKDF2 (hmac-sha256, {OTP}, {Salt}, {c}, {n})={n/8} bytes hash value The password is generated using an OTP generator, and the value Salt is code with certain bytes (e.g., 16 bytes) generated using a random number generator. An arbitrary fixed value (e.g., 1024) is used as the iteration count c.

A security level, such as integrity, reliability, confidentiality, etc., for transmission and reception of management data for integrated management of a uniway security gateway system physically consisting of a pair of fairs between a secure area and a control area may be greatly increased using a combination of the OTP and the encryption key derivation function PBKDF2, thereby ensuring very high security and safety levels of a communication channel for transmitting and receiving the management data of the uniway security gateway system.

The UGM tag (UGM_TAG) 410 included for actual transmission of the management data is equal to a subsequent UGM_TAG (=HashKey {OTP}({n/8} Bytes)+Salt(m bytes). The salt value used when generating the HashKey {OTP} should be shared to verify the integrity of HashKey {OTP} on the basis of a premise that the same {OTP} value is generated by a transmitting device and a receiving device (within a predetermined time range).

The integrity of HashKey {OTP} is verified by the uniway communication data managers 100 and 200 of the transmitting device 10 and the receiving device 20, and integrity verification performed by the transmitting device 10 and the receiving device 20 has features described below.

1) The first uniway communication data manager (sUM) 100 of the transmitting device (UG-sT) 10 in the secure area 1 performs integrity verification only on a UGM datagram packet (UGM_FLAG="0x02") generated by the receiving device (UG-oR) 20 in the control area 2 and transmitted to the first receiver (sURx) 120, and drops this packet when an integrity error occurs.

2) Similarly, the second uniway communication data manager (oUM) 200 of the receiving device (UG-oR) 10 performs integrity verification only on a UGM datagram packet (UGM_FLAG="0x01") generated by the transmitting device (UG-sT) 10 in the secure area 1 and transmitted to the second receiver (oURx) 220, and drops this packet when an integrity error occurs. This is to minimize resource utilization due to integrity verification by omitting integrity verification of the UGM datagram packets generated by the device managers 130 and 230 of the transmitting device 10 and the receiving device 20.

Figure 5:
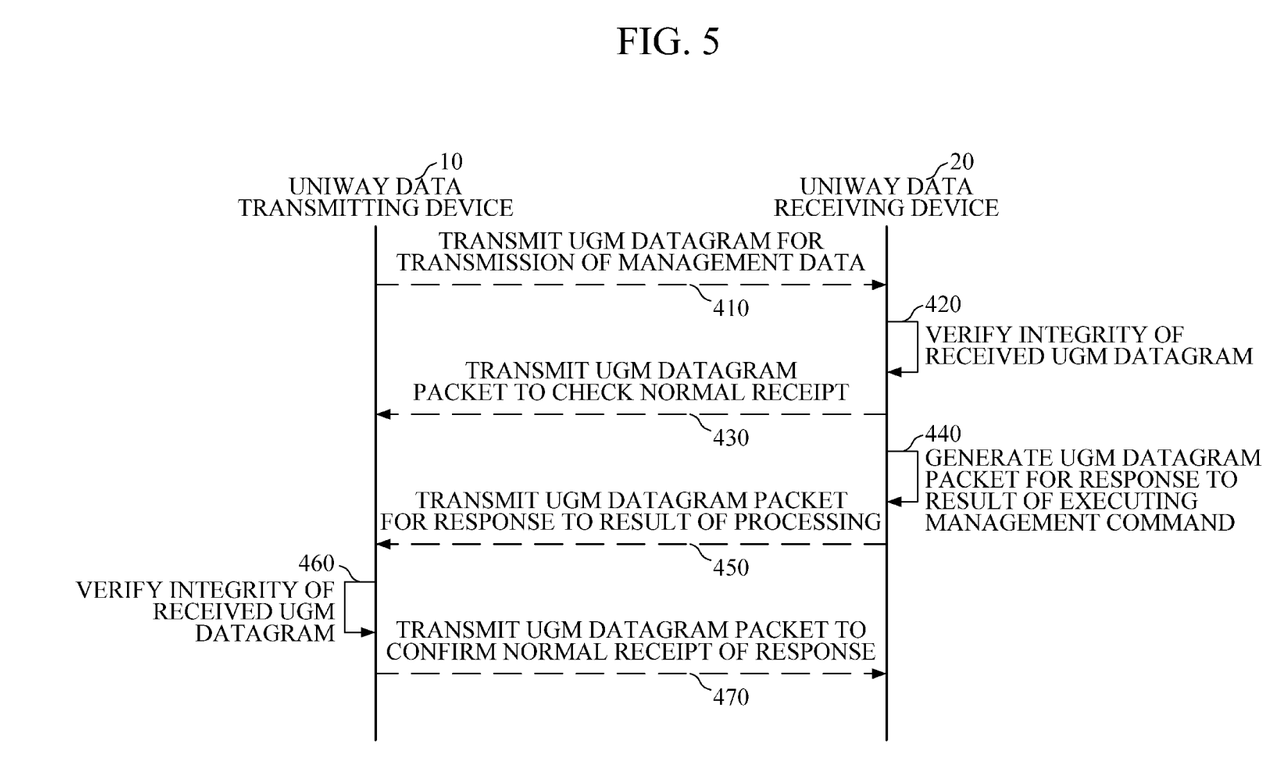
FIG. 5 is a flowchart of a method of controlling a uniway data transmission channel from a control area to a secure area according to an embodiment of the present disclosure.

FIG. 5 is a flowchart of a method of controlling a uniway data transmission channel from a control area to a secure area according to an embodiment of the present disclosure.

Referring to FIGS. 2 and 5, transmission of a UGM datagram packet for transmission of management data through activation of the second communication channel 320 in one direction from the control area 2 to the secure area 1 is performed in an order described below.

When a UGM datagram for transmission of a management command (e.g., a management command to update policy/firmware or to inquire into a log) or management data (e.g., policy data or a firmware update file) transmitted from an integrated management server is received by the second receiver (oURx) 220 of the receiving device (UG-oR) 20 (410), the second uniway communication data manager (oUM) 200 performs integrity verification on the UGM datagram (420). When the integrity verification succeeds, the second uniway communication data manager (oUM) 200 transmits the UGM datagram packet to the second transmitter (oUTx) 210 while transmitting the UGM datagram packet to the second device manager (oDM) 230. The second transmitter (oUTx) 210 transmits a UGM datagram packet to check normal receipt from the control area 2 to the secure area 1 via the activated second communication channel 320 (430). Then, the transmitting device (UG-sT) 10 receives the UGM datagram packet through the first receiver (sURx) 120. Next, the transmitting device (UG-sT) 10 verifies that the receiving device (UG-oR) 20 has successfully received the management data by receiving a management data transmission datagram from the first receiver (sURx) 120 through the first uniway communication data manager (sUM) 100. Thereafter, the transmitting device (UG-sT) 10 transmits the management data transmission datagram to the integrated management server 12 from the first uniway communication data manager (sUM) 100 through the first device manager (sDM) 130. This process is performed to confirm that the management command transmitted from the integrated management server 12 is transmitted to the receiving device (UG-oR) 20 normally in a special environment of the uniway security gateway system.

Next, a UGM datagram packet for a response (e.g., a policy/firmware update completion or failure, a log inquiry result data reply, or the like) to a result of executing the management command from the integrated management server 12 is generated by the second device manager (oDM) 230 of the receiving device (UG-oR) 20 (440) and transmitted to the second uniway communication data manager (oUM) 200. The second uniway communication data manager (oUM) 200 skips integrity verification of the UGM datagram packet the integrity of the UGM datagram packet may be verified through identification of a UTM_FLAG value. In addition, the second uniway communication data manager (oUM) 200 transmits the UGM datagram packet to the second transmitter (oUTx) 210. Then, the second transmitter (oUTx) 210 transmits the UGM datagram packet for a response to a result of processing the management data from the control area 2 to the secure area 1 through the activated second communication channel 320 (450). The transmitting device (UG-sT) 10 receives the UGM datagram packet through the first receiver (sURx) 120. Next, the transmitting device (UG-sT) 10 may verify the response to the result of processing the management data from the receiving device (UG-oR) 20 by receiving the management data transmission datagram from the first receiver (sURx) 120 through the first uniway communication data manager (sUM) 100. Next, the transmitting device (UG-sT) 10 transmits the management data transmission datagram to the integrated management server 12 from the first uniway communication data manager (sUM) 100 through the first device manager (sDM) 130. The integrated management server 12 processes the response to the previously transmitted management command.

Meanwhile, in order to confirm that the response to the management data of the receiving device (UG-oR) 20 has been successfully transmitted to the transmitting device (UG-sT) 10, the first receiver (sURx) 120 of the transmitting device (UG-sT) 10 receives the UGM datagram packet transmitted from the second device manager (oDM) 230 of the receiving device (UG-oR) 20 and transmits the UGM datagram packet to the first uniway communication data manager (sUM) (100). The first uniway communication data manager (sUM) 100 performs integrity verification on the received UGM datagram packet (460), and when the integrity verification (460) succeeds, the first uniway communication data manager (sUM) 100 transmits the UGM datagram packet to the first transmitter (sUTx) 110 while transmitting the UGM datagram packet to the first device manager (sDM) 130 (470). The first transmitter (sUTx) 110 receives the UGM datagram packet from the second receiver (oURx) 220 of the receiving device (UG-oR) 20 from the secure area 1 to the control area 2 through the first communication channel 310. Thereafter, the receiving device (UG-oR) 20 may verify that the response to the management data of the receiving device (UG-oR) 20 has been successfully transmitted to the transmitting device (UG-sT) 10 by receiving the management data transmission datagram from the second receiver (oURx) 220 through the second uniway communication data manager (oUM) 200. The management data transmission datagram may be transmitted to the second device manager (oDM) 230. The above-described process is performed to confirm that a UGM datagram for a response transmitted to the integrated management server 12 is transmitted to the transmitting device (UG-sT) 10 normally in a special environment of the unidirectional security gateway system.

In a uniway data transmission method using a communication channel for management and a uniway security gateway system for performing the same according to an embodiment, management data may be safely transmitted and received between a secure area and a control area which are physically isolated from each other. In this case, a security level, e.g., integrity, reliability, or confidentiality of transmission and reception of the management data may be greatly increased by providing a separate communication channel for the transmission and reception of the management data for integrated management of the uniway security gateway system physically consisting of a pair of fairs between the secure area and the control area.

Furthermore, as the management data is generated using a combination of an OTP and a key derivation function, it is possible to ensure very high security and safety levels for the communication channel for transmission and reception of the management data of the uniway security gateway system.

The present disclosure has been described above with respect to embodiments. It will be apparent to those of ordinary skill in the technical field to which the present disclosure pertains that the present disclosure may be implemented in a modified form without departing from the essential characteristics of the present disclosure. Therefore, the embodiments set forth herein should be considered in a descriptive sense only and not for purposes of limitation. The scope of the present disclosure is defined in the claims rather than the foregoing description, and all differences equivalent thereto should be interpreted as being included in the present disclosure.

What is claimed is:

1. A uniway security gateway system comprising:
a uniway data transmitting device located in a secure area; and
a uniway data receiving device, located in a control area, configured to perform integrity verification on a management data transmission datagram and transmit the verified management data transmission datagram to a first receiver of the uniway data transmitting device through a uniway data transmission channel, while transmitting the verified management data transmission datagram when the integrity verification succeeds;
wherein the uniway data transmitting device and the uniway data receiving device provide a first communication channel for transmitting and receiving data in one direction from the secure area to the control area and a second communication channel for transmitting and receiving management data in one direction from the control area to the secure area,
wherein the uniway data transmitting device is configured to confirm that the uniway data receiving device receives management data associated with the management data transmission datagram by receiving the management data transmission datagram.

2. The uniway security gateway system of claim 1, wherein the uniway data transmitting device and the uniway data receiving device additionally define a management data transmission datagram for transmission of the management data between the uniway data transmitting device and the uniway data receiving device to be differentiated from an application data transmission datagram for transmission of application data from the secure area to the control area, and transmit and receive the management data transmission datagram in one direction.

3. The uniway security gateway system of claim 2, wherein the management data transmission datagram comprises a header which includes a flag for identifying the management data transmission datagram and a transmission direction and a tag for integrity verification as to whether the management data transmission datagram is valid.

4. The uniway security gateway system of claim 3, wherein the tag for integrity verification of the management data transmission datagram comprises:
a hash key {OTP} generated by inputting a one-time password (OTP), which is generated using an OTP synchronized between the uniway data transmitting device and the uniway data receiving device, into an encryption key derivation function; and
a salt value used for the generation of the hash key {OTP}.

5. The uniway security gateway system of claim 1, wherein the uniway data transmitting device comprises:
a first transmitter configured to transmit application data and the management data in one direction;
the first receiver configured to receive the management data in one direction;
a first device manager configured to generate the management data; and
a first uniway communication data manager configured to manage transmitted and received data and verify integrity of the management data, and
the uniway data receiving device comprises:
a second transmitter configured to transmit the management data in one direction to the secure area;
a second receiver configured to receive the application data and the management data in one direction;
a second device manager configured to generate the management data; and
a second uniway communication data manager configured to manage transmitted and received data and verify integrity of the management data.

6. The uniway security gateway system of claim 5, wherein the first uniway communication data manager verifies only integrity of a management data transmission datagram generated by the uniway data receiving device and received through the first receiver and skips verification of integrity of a management data transmission datagram generated by the first device manager, and
the second uniway communication data manager verifies only integrity of a management data transmission datagram generated by the uniway data transmitting device and received through the second receiver and skips verification of integrity of a management data transmission datagram generated by the second device manager, thereby minimizing a resource utilization rate.

7. The uniway security gateway system of claim 5, wherein the second receiver receives a management data transmission datagram for transmission of the management data,
the second uniway communication data manager performs integrity verification on the received management data transmission datagram and transmits the management data transmission datagram to the second transmitter while transmitting the management data transmission datagram to the second device manager when the integrity verification succeeds,
the second transmitter transmits the management data transmission datagram to the first receiver of the uniway data transmitting device via the uniway data transmission channel, and
the first uniway communication data manager confirms that the uniway data receiving device receives the management data normally by receiving the management data transmission datagram from the first receiver.

8. The uniway security gateway system of claim 5, wherein the second device manager generates a management data transmission datagram for a response to the management data and transmits the management data transmission datagram to a second uniway communication data manager,
the second uniway communication data manager skips verification of integrity of the management data transmission datagram generated by the second device manager and transmits the management data transmission datagram to the second transmitter,
the second transmitter transmits the management data transmission datagram received from the second uniway communication data manager to the first receiver of the uniway data transmitting device via the uniway data transmission channel, and
the first uniway communication data manager confirms the response to the management data from the uniway data receiving device by receiving the management data transmission datagram from the first receiver.

9. The uniway security gateway system of claim 5, wherein the first receiver receives the management data transmission datagram from the uniway data receiving device and transmits the management data transmission datagram to the first uniway communication data manager to confirm that a response to the management data from the uniway data receiving device is transmitted to the uniway data transmitting device normally,
the first uniway communication data manager performs integrity verification on the management data transmission datagram received through the first receiver and transmits the management data transmission datagram to the first transmitter while transmitting the management data transmission datagram to the first device manager when the integrity verification succeeds,
the first transmitter transmits the management data transmission datagram received from the first uniway communication data manager to the second receiver of the uniway data receiving device via the uniway data transmission channel, and
the second uniway communication data manager confirms that the response to the management data from the uniway data receiving device is transmitted to the uniway data transmitting device normally by receiving the management data transmission datagram from the second receiver.

10. The uniway security gateway system of claim 1, wherein the integrity verification is received through a second uniway communication data manager and the verified management data transmission datagram is transmitted to a second transmitter while transmitting the verified management data transmission datagram to a second device manager when the integrity verification succeeds.

11. The uniway security gateway system of claim 1, wherein the management data transmission datagram is received from the first receiver through a first uniway communication data manager.

12. A uniway data transmission method comprising:
receiving, by a uniway data receiving device, a management data transmission datagram for transmission of management data through a second receiver;
performing, by the uniway data receiving device, integrity verification on the management data transmission datagram received through a second uniway communication data manager and transmitting the verified management data transmission datagram to a second transmitter while transmitting the verified management data transmission datagram to a second device manager when the integrity verification succeeds;
transmitting, by the uniway data receiving device, the management data transmission datagram to a first receiver of a uniway data transmitting device through a uniway data transmission channel; and
confirming, by the uniway data transmitting device, that the uniway data receiving device receives the management data normally by receiving the management data transmission datagram from the first receiver through a first uniway communication data manager,
wherein the uniway data transmitting device, located in a secure area, and the uniway data receiving device, located in a control area, provide a first communication channel for transmitting and receiving data in one direction from the secure area to the control area and a second communication channel for transmitting and receiving management data in one direction from the control area to the secure area.

13. The uniway data transmission method of claim 12, further comprising:
generating, by the uniway data receiving device, a management data transmission datagram for a response to the management data through a second device manager and transmitting the management data transmission datagram to the second uniway communication data manager;
skipping, by the uniway data receiving device, integrity verification through the second uniway communication data manager and transmitting the management data transmission datagram to the second transmitter;
transmitting, by the uniway data receiving device, the management data transmission datagram to a first receiver of the uniway data transmitting device through the uniway data transmission channel; and
confirming, by the uniway data transmitting device, a response to a result of processing the management data from the uniway data receiving device by receiving the management data transmission datagram from the first receiver through a first uniway communication data manager.

14. The uniway data transmission method of claim 12, further comprising:
performing, by the uniway data transmitting device, integrity verification by transmitting the management data transmission datagram received through the first receiver to a first uniway communication data manager to confirm that a response to the management data from the data receiving device is transmitted to the uniway data transmitting device normally;

transmitting, by the uniway data transmitting device, the management data transmission datagram to a first transmitter through the first uniway communication data manager while transmitting the management data transmission datagram to a first device manager when the integrity verification succeeds;

transmitting, by the uniway data transmitting device, the management data transmission datagram to a second receiver of the uniway data receiving device through the first transmitter via a uniway data transmission channel; and confirming, by the uniway data receiving device, that the response to the management data from the uniway data receiving device is transmitted to the uniway data transmitting device normally by receiving the management data transmission datagram from the second receiver through the second uniway communication data manager.

* * * * *